Sept. 11, 1951  J. J. BREHANY ET AL  2,567,164
PORTABLE LIQUID CONTAINER
Filed Sept. 22, 1945  6 Sheets-Sheet 1
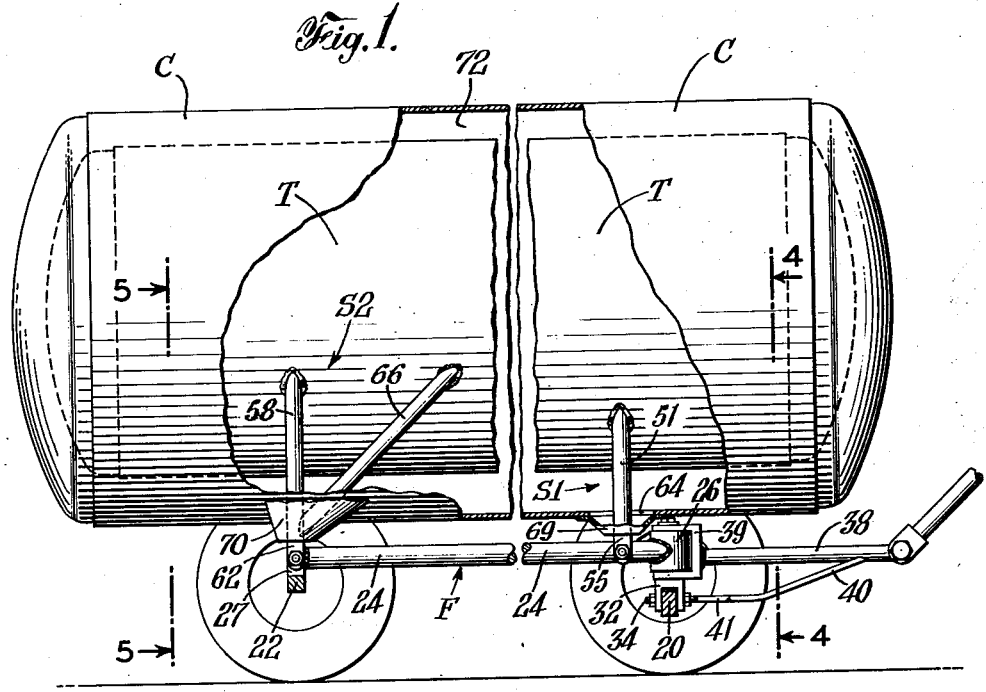
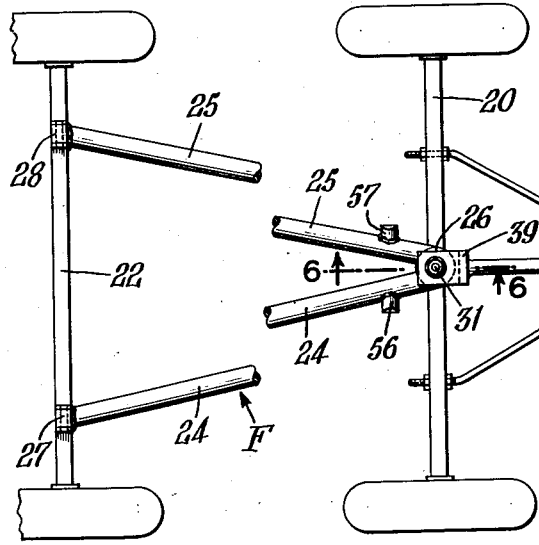
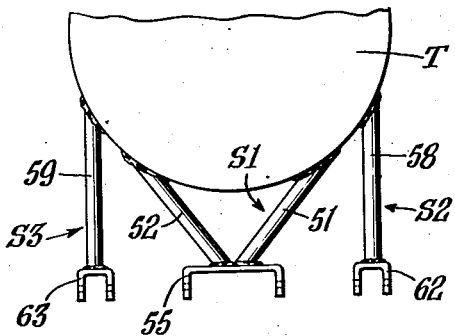
INVENTORS
JOHN J. BREHANY
PHILLIP M. AHLSTRAND
BY
ATTORNEY Sept. 11, 1951 J. J. BREHANY ET AL 2,567,164
PORTABLE LIQUID CONTAINER
Filed Sept. 22, 1945 6 Sheets-Sheet 2
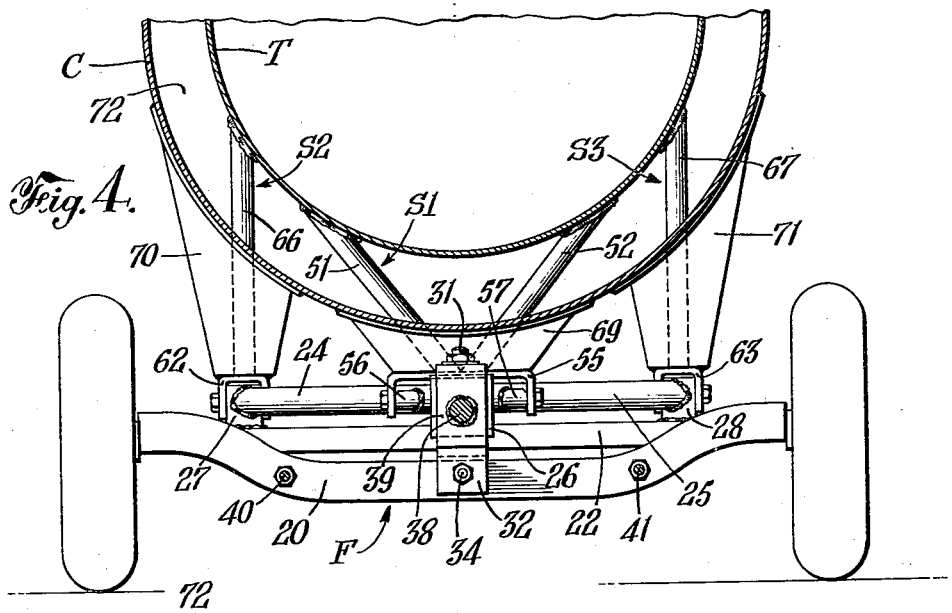
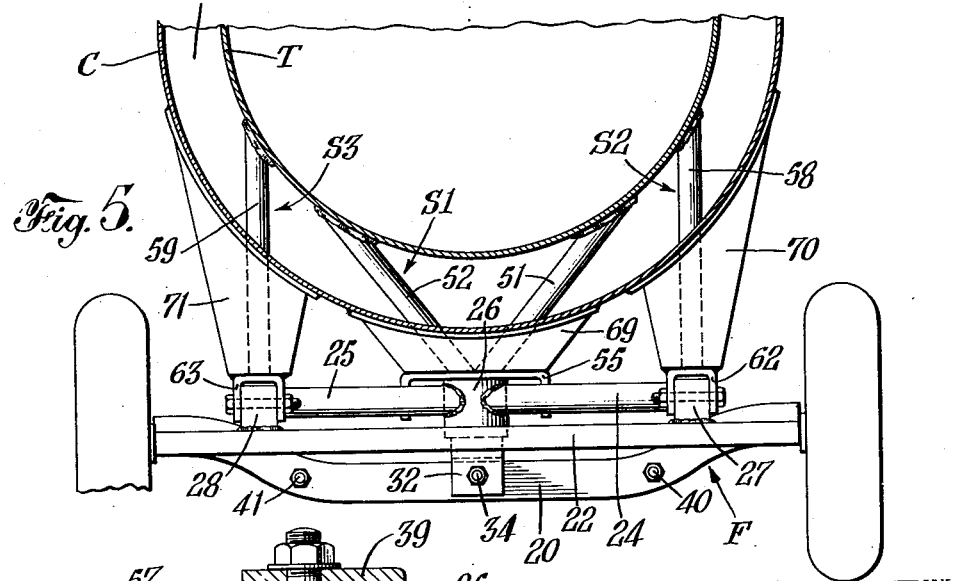
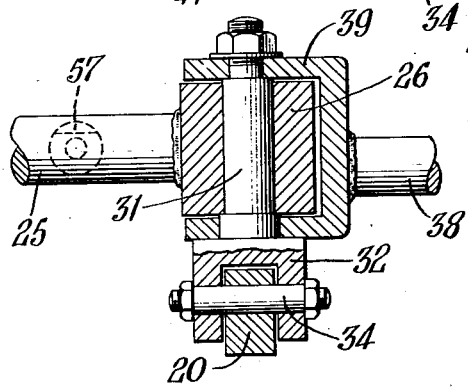
INVENTORS
JOHN J. BREHANY
PHILLIP M. AHLSTRAND
BY
ATTORNEY

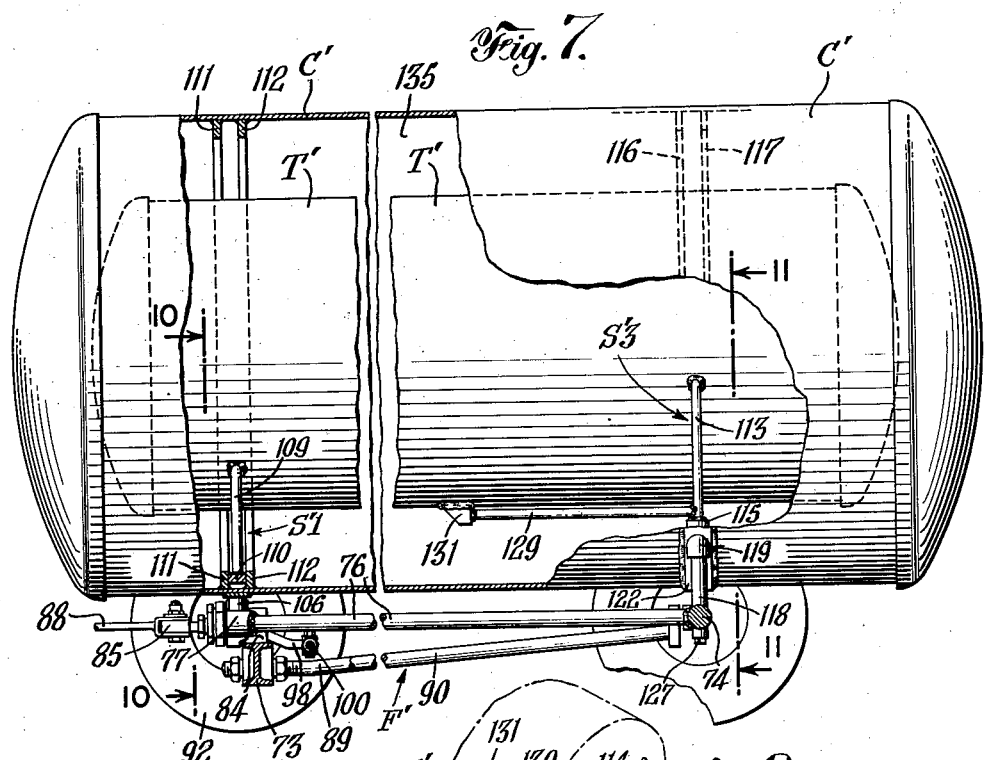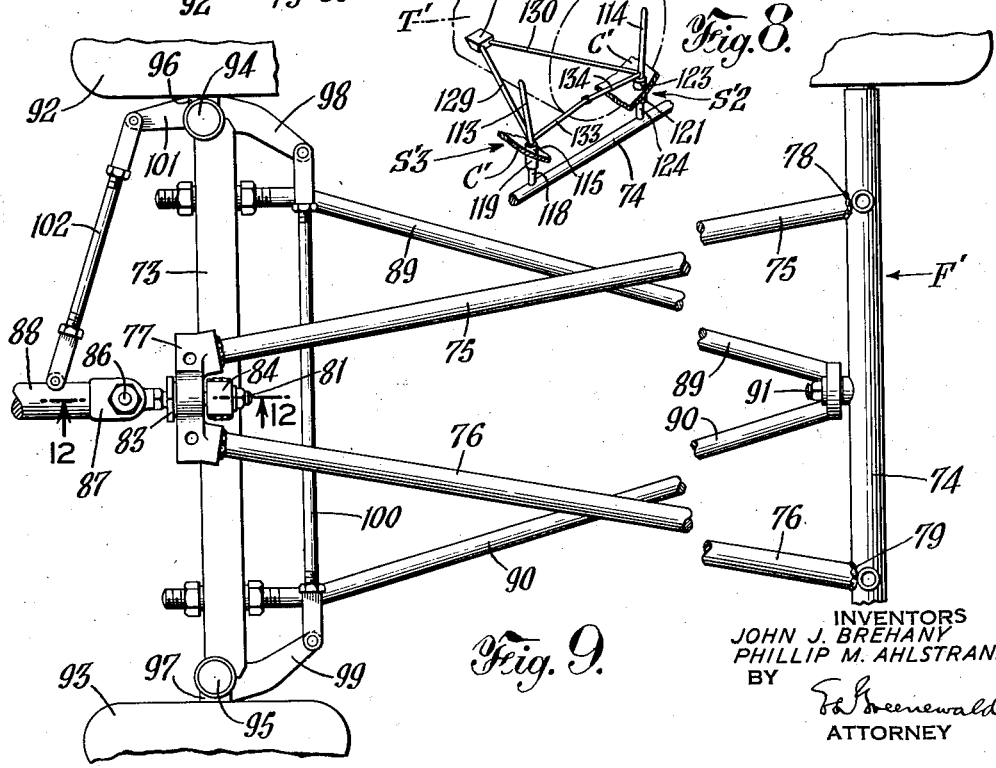

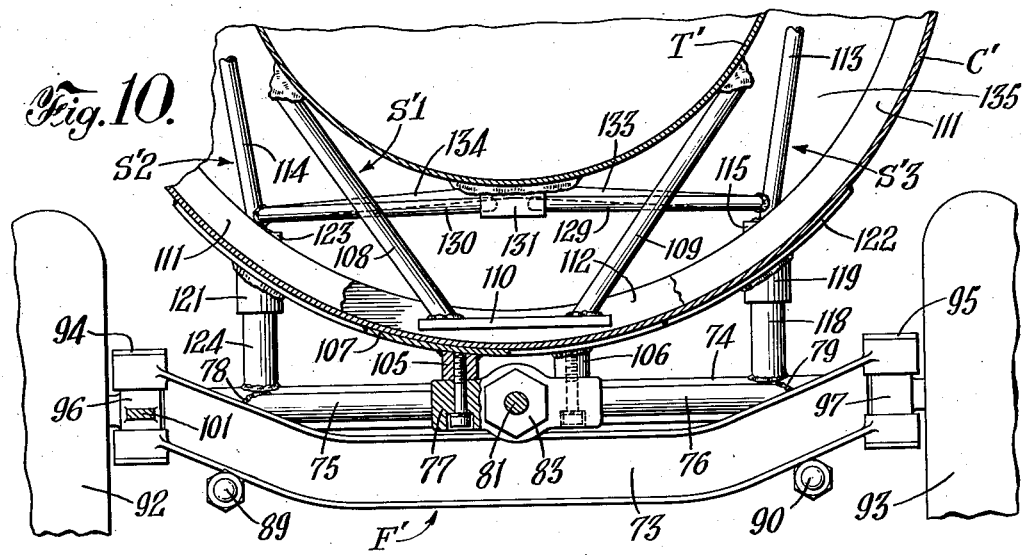
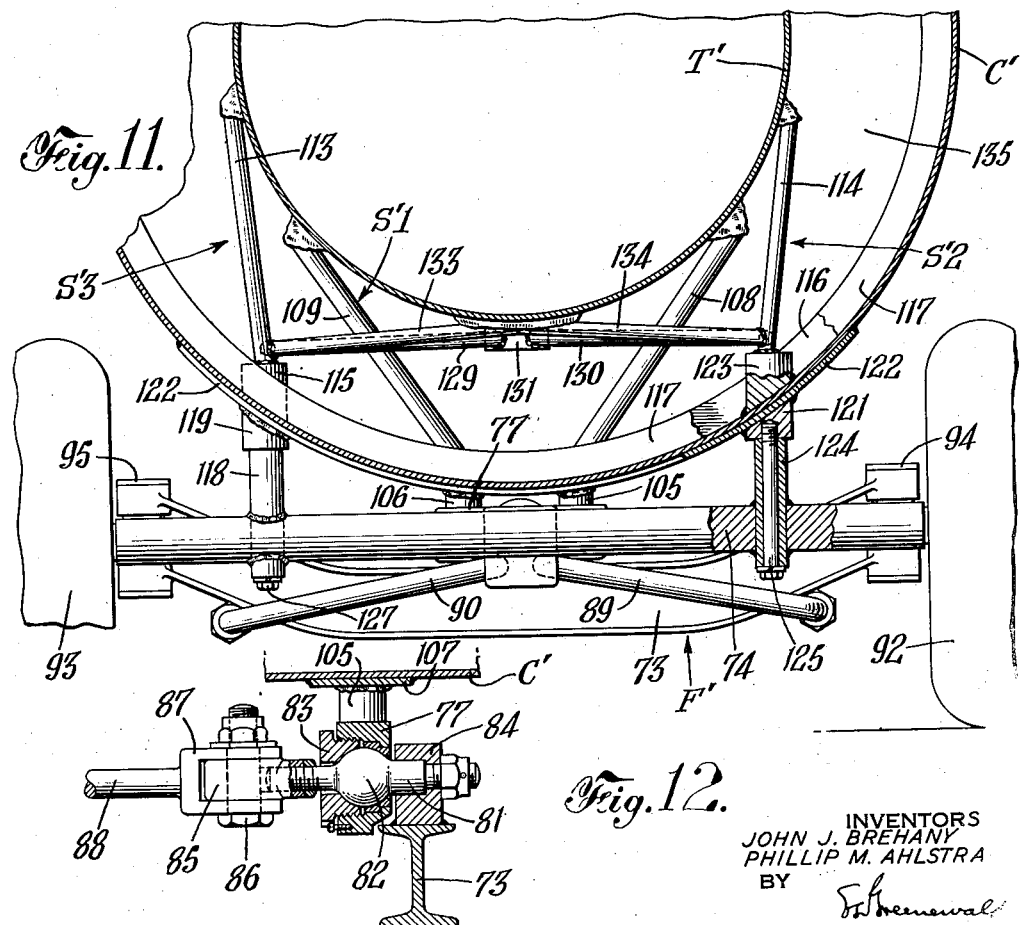

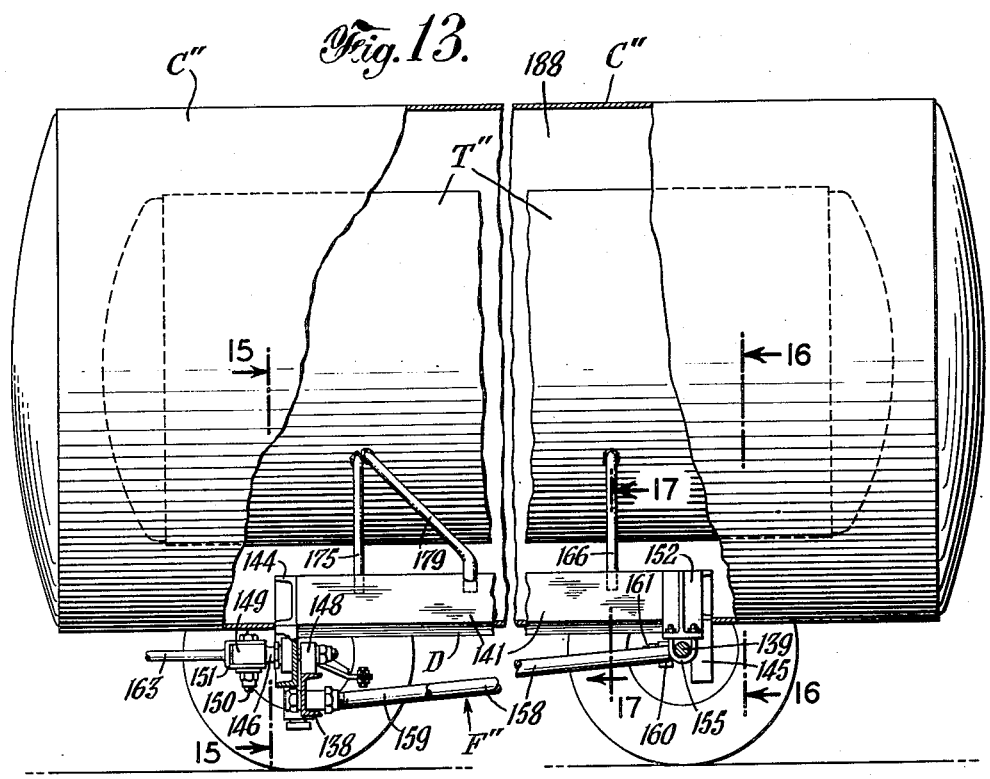
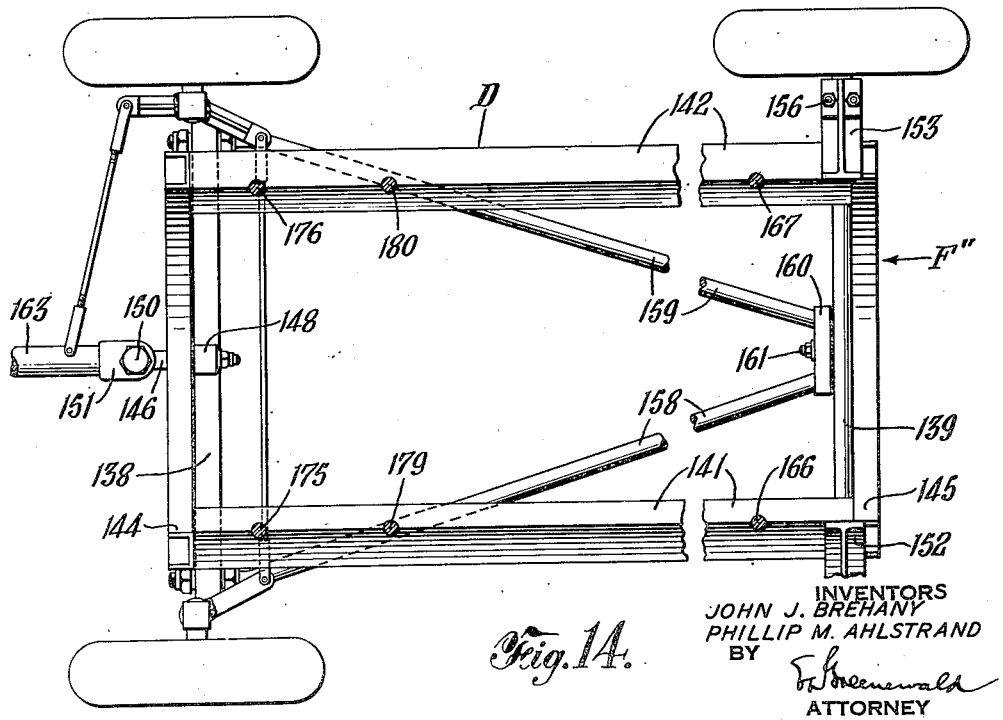

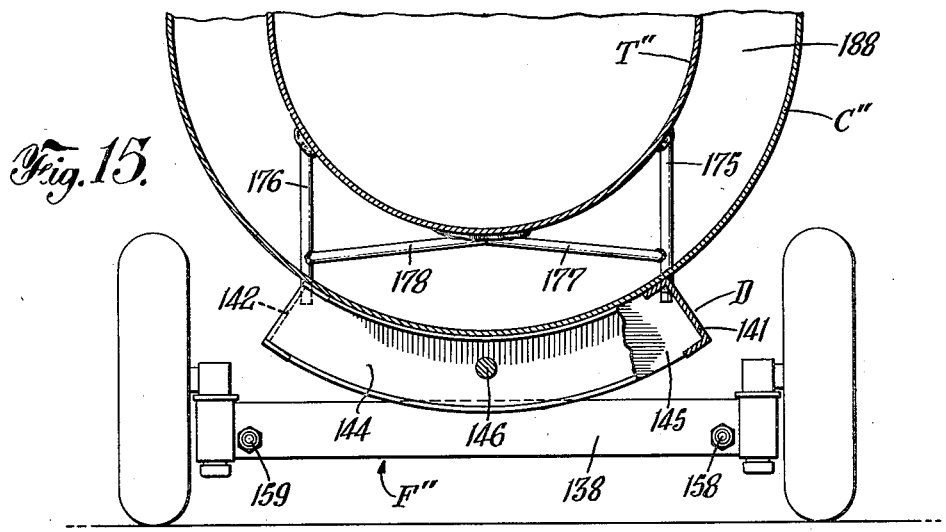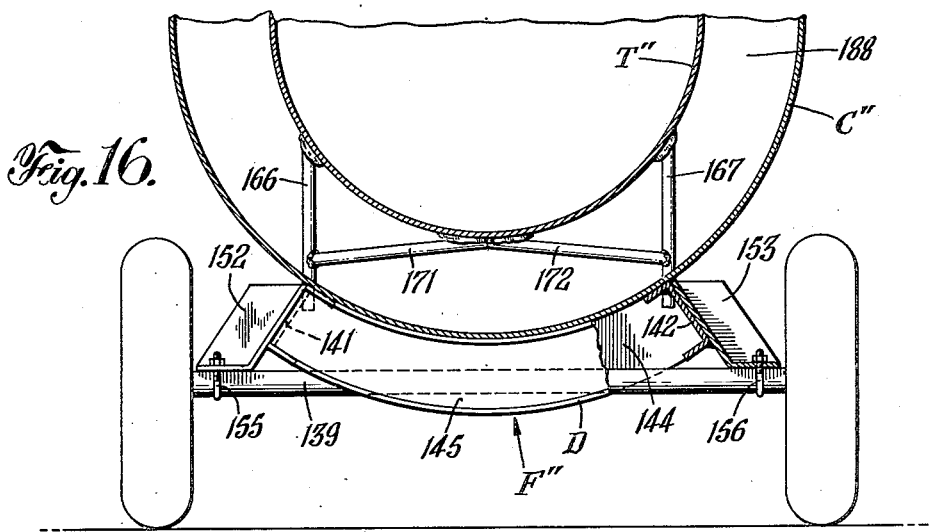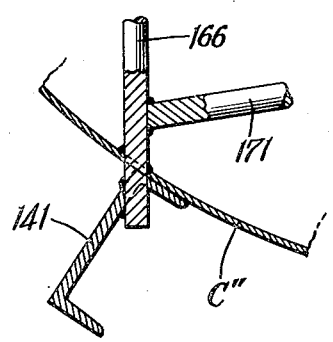

Patented Sept. 11, 1951

2,567,164

UNITED STATES PATENT OFFICE 2,567,164

PORTABLE LIQUID CONTAINER

John J. Brehany and Phillip M. Ahlstrand, Kenmore, N. Y., assignors, by mesne assignments, to Union Carbide and Carbon Corporation, a corporation of New York Application September 22, 1945, Serial No. 618,020

22 Claims. (Cl. 280—5)

This invention relates to portable containers for liquids having low boiling points, such as liquid oxygen and liquid nitrogen, and especially to such containers of the type comprising a central storage tank enclosed by a casing which is packed with insulating material. More particularly, the invention relates to such portable containers which are mounted on wheeled vehicles.

Among the objects of the present invention are to provide a tank vehicle: which is so constructed as to avoid distortion of the tank when the vehicle is travelling over an uneven surface; which is provided with an internal tank and an enclosing casing supported in such a way that distortion of both the tank and the casing are prevented, whereby they are maintained leaktight; which is provided with an internal tank and an enclosing casing so constructed and supported that the intervening space can be evacuated to decrease heat leak to the tank; and which has compression-type tank supports which are constructed for high resistance to longitudinal and transverse loads. Another object is the provision of a unitary container comprising an internal tank and an enclosing casing, both of which are supported on compression-type supports having high resistance to longitudinal and transverse loads while reducing to a minimum heat leak to the tank. Still another object is the provision of a tank vehicle comprising a frame carrying a double-walled container which can be removed as a unit from the frame.

The above and other objects, and the novel features of the invention, will become apparent from the following description, having reference to the annexed drawings, wherein:

Fig. 1 is a side elevational view, parts being broken away and parts being in section, of one type of tank vehicle embodying the principles of the invention;

Fig. 2 is a plan view of the frame of the tank vehicle shown in Fig. 1;

Fig. 3 is a fragmentary end view of the internal tank and its supports as seen from the left in Fig. 1;

Figs. 4 and 5 are fragmentary cross-sectional views of the tank vehicle taken along the lines 4—4 and 5—5, respectively, in Fig. 1;

Fig. 6 is a vertical sectional view taken along the line 6—6 in Fig. 2;

Fig. 7 is a side elevational view, parts being broken away and parts being in section, of a modified form of tank vehicle embodying the principles of the invention;

Fig. 8 is an isometric view showing schematically the arrangement of the supports for one end of the tank shown in Fig. 7;

Fig. 9 is a plan view of the frame of the vehicle shown in Fig. 7;

Figs. 10 and 11 are fragmentary cross-sectional views taken along the lines 10—10 and 11—11, respectively, in Fig. 7;

Fig. 12 is a vertical sectional view taken along the line 12—12 in Fig. 9;

Fig. 13 is a side elevational view, parts being broken away and parts being in section, of a third modified form of tank vehicle embodying the principles of the invention;

Fig. 14 is a plan view of the frame of the tank vehicle shown in Fig. 13;

Figs. 15 and 16 are fragmentary cross-sectional views taken along the lines 15—15 and 16—16, respectively, in Fig. 13; and Fig. 17 is a vertical sectional view taken along the line 17—17 in Fig. 13.

Referring to Figs. 1 to 6 inclusive, the tank vehicle comprises a frame F, including a transversely extending front axle 20 and a transversely extending rear axle 22, both of which have wheels rotatably mounted thereon. The two axles are connected together by longitudinal connecting means comprising a pair of rods 24 and 25 joined together at the front of the frame by welding to a vertical sleeve 26, and diverging rearwardly from one another to the rear axle 22 where they are joined rigidly by welding to transversely spaced ears 27 and 28 welded to and projecting up from the rear axle. Sleeve 26 fits over a vertical pivot such as stud 31 projecting up from a saddle 32 which straddles front axle 20 at its center and is pivotally secured thereto by a pivot bolt 34 extending longitudinally through the front axle and both sides of the saddle.

For drawing and steering the vehicle there is provided a drawbar 38 having a clevis 39 including bifurcations fitting over the stud 31 and arranged above and below sleeve 26. A pair of diagonal braces 40 and 41 converge together forwardly from transversely spaced points on the axle 20 on opposite sides of the drawbar 38 to a welded junction with the drawbar. Swinging drawbar 38 steers the vehicle by turning front axle 20 on its vertical pivot 31.

A cylindrical tank T is arranged longitudinally above frame F.

A front support S1 for the front end of the tank comprises a pair of downwardly converging struts 51 and 52 having upper ends welded to the tank at transversely spaced positions, and lower ends arranged close together and welded to the top of a clevis 55 which fits over and is detachably bolted to a pair of horizontal ears 56 and 57 projecting laterally from the longitudinal frame members 24 and 25, respectively, just to the rear of the sleeve 26.

A pair of rear supports S2 and S3 for the other end of tank T comprises a pair of vertical posts 58 and 59 having upper ends secured by welding to the opposite sides of the tank, and lower ends welded to clevises 62 and 63. Clevises 62 and 63 fit over and are detachably bolted to ears 27 and 28 on the rear axle 22. The pair of rear supports also comprises a pair of forwardly and upwardly inclined braces 66 and 67 having lower ends welded to posts 58 and 59, respectively, just above the clevises 62 and 63, and having upper ends welded to the opposite sides of the tank on the same sides as the posts 58 and 59, respectively, but spaced longitudinally forward from the respective posts.

A cylindrical casing C spaced above frame F encloses tank T in spaced relation thereto. Casing C has aperture 64 in its bottom wall through which pass the struts 51 and 52 in spaced relation to the surrounding rim of the aperture. Near its rear end casing C has a pair of transversely spaced apertures through which pass the posts and braces of the rear supports S2 and S3 in spaced relation to the surrounding rims of the apertures. Casing C is supported by downwardly tapering hollow front and rear legs 69, 70 and 71 having out-turned flanges on their upper ends welded gas tightly to the casing wall around the several apertures, and at their lower ends welded gas-tightly to the tops of clevises 55, 62, and 63, respectively. Thus, the casing C and the tank T are supported on the same supports S1, S2, and S3.

For reducing the evaporation of liquid oxygen in tank T, the space 72 between the container and the tank, can be filled with a body of insulating material such as magnesite or mineral wool. Heat leak to tank T can be reduced further by maintaining a vacuum in the space 72 since casing C has a gas-tight construction. Evaporation losses also are reduced by making the several support members of material which has low heat conductivity, such as stainless steel, and having as great a length as possible between metal junctions commensurate with the necessary rigidity. Hollow legs 69, 70, and 71, make possible greater lengths of the supports between metal junctions than would otherwise be possible.

When the vehicle of Figs. 1 to 6 is in motion over a rough surface, the frame F will not twist because differential movement of the front and rear axles causes the front axle 20 to pivot on the longitudinal pivot 34 relatively to the longitudinal connecting rods 24 and 25. As a result, distortion of the tank T and the casing C is avoided. Additionally, by mounting the casing C and the tank T both rigidly on the same supports, the tank and the casing keep substantially the same relative positions at all times, thus assuring that the space 72 will remain properly packed with insulating material. Experience has shown that the construction of supports S1, S2, and S3 is adequate to withstand both transverse and longitudinal loads caused by movement of the body of liquid in tank T.

In the modification of the invention shown in Figs. 7 to 12, inclusive, a frame F' comprises front and rear transversely extending axles 73 and 74 having wheels mounted rotatably thereon. The two axles are connected together by a longitudinal frame member including a pair of longitudinal rods 75 and 76 which are joined at their front ends by welding to a centrally arranged connecting frame member or coupler 77, and diverge rearwardly from each other to the rear axle 74 where they are welded at transversely spaced positions 78 and 79. Coupler 77 is pivotally secured to the front axle 73 by a longitudinal pivot pin 81 having a centrally arranged ball 82 secured by a hollow nut 83 in a socket in the coupler. The pivot pin 81 protrudes rearwardly from the coupler 77 and is bolted to a mounting block 84 welded to the top of the front axle 73. The front end of pivot pin 81 engages a sleeve 85 through which passes a vertical bolt 86 holding the clevis 87 of drawbar 88 in place on opposite sides of the sleeve. This construction permits the coupler 77 to pivot on the ball 82 relatively to the front axle 73.

Frame F' is reenforced by a second pair of longitudinal connecting rods 89 and 90 which are joined together at their rear ends and pivotally connected to the rear axle 74 by a longitudinal pivot bolt 91. Rods 89 and 90 diverge forwardly from the rear axle and are rigidly bolted to the front axle 73 at transversely spaced positions. Axles 73 and 74 thus are held in fixed parallel planes.

Front wheels 92 and 93 are pivotally mounted on vertical kingpins 94 and 95 by sleeves 96 and 97 which carry rearwardly projecting steering arms 98 and 99 connected together by a tie-rod 100. Sleeve 96 also carries a forwardly projecting steering arm 101 which is coupled by a drag link 102 to drawbar 88 in such a way that when the drawbar is moved laterally the front wheels turn about the kingpins 94 and 95.

A cylindrical casing C' is arranged longitudinally above frame F', and a tank T' is within the casing in spaced relation thereto. A first support S'1 for the front ends of both the casing and the tank comprises a pair of downwardly projecting transversely spaced ears 105 and 106 welded to an arcuate reenforcing band 107 which is integrated with the bottom wall of the casing by welding. Ears 105 and 106 rest on the coupler 77, and are detachably bolted thereto, thus forming a mount between the casing and the longitudinal frame member adjacent to the front axle 73. A pair of struts 108 and 109 have their upper ends welded at transversely spaced positions to the tank and converge together downwardly to a horizontal junction plate 110 to which they are welded at closely spaced points directly above mounting ears 105 and 106. Plate 110 is located between and welded to two longitudinally spaced circumferential internal reenforcing ribs 111 and 112 which are integrated with the inner wall of the casing by welding. The inclination of the struts 108 and 109 is such that their longitudinal axes intersect on the pivot 81, thereby reducing bending of the struts to a minimum when centrifugal force acts on the liquid in tank T' as the vehicle turns corners.

A pair of rear supports S'2 and S'3 for the casing C' and the tank T' near the rear axle 74 includes a pair of posts 113 and 114 having their upper ends welded to opposite sides of the tank at transversely spaced points near the rear end thereof. Posts 113 and 114 are welded at their lower ends to pedestals 115 and 123, respectively, positioned between and welded to a pair of internal circumferential ribs 116 and 117 integrated with casing C' by welding. Supports S'2 and S'3 also comprise two external blocks 119 and 121 welded to reenforcing strap 122 directly below pedestals 115 and 123, and resting on hollow legs 118 and 124 which extend down through and are welded to rear axle 74 at transversely spaced positions. Bolts 125 and 127 pass up through legs 118 and 124 and are threaded into external blocks 119 and 121 to hold the casing C' rigidly in place while permitting its removal at will from the frame F'. Since the pedestals 115 and 123 are integrated with the casing C' by welding, it is apparent that these members together with the internal posts and the external hollow legs act as unitary uprights having upper ends secured to tank T' at transversely spaced positions and lower ends secured to the rear axle 74 at transversely spaced positions.

Rear supports S'2 and S'3 also comprise a pair of substantially horizontal longitudinally extending braces 129 and 130 welded at their rear ends to the lower ends of posts 113 and 114, respectively, and converging together forwardly to a small block 131, directly below the longitudinal axis of the tank. Block 131 is welded both to the braces and the bottom wall of the tank.

Additionally, the rear supports S'2 and S'3 include a pair of oppositely arranged upwardly and inwardly sloping transverse braces 133 and 134 having outer ends welded to the lower end portions of posts 113 and 114, respectively, and inner ends welded together and to the bottom of the tank T' directly below its longitudinal axis in such a position that the transverse braces, and the two upper posts 113 and 114 lie substantially in the same vertical plane.

It is apparent that the tank T' is adequately braced to resist both transverse and longitudinal loads, and that the frame and container will not be deformed when the vehicle is passing over a rough surface because the front axle is pivoted on a longitudinal axis with respect to the rest of the frame. Heat leak to the tank T' here also is reduced by the provision of support members of material having poor heat conductivity and by packing the space 135 between the tank T' and the casing C' with insulating material. Since the casing C' is gas-tight, a vacuum can also be maintained to reduce heat leak. Relative movement between tank T' and casing C' is prevented by the support construction described, thus preventing displacement of insulating material.

In the modification shown in Figs. 13 to 17, inclusive, the frame F'' comprises transversely extending front and rear axles 138 and 139, and a longitudinally extending cradle D rigidly connected to the rear axle at transversely spaced points and pivotally connected to the front axle on a single longitudinal pivot. Cradle D includes a pair of longitudinally extending transversely spaced parallel channel beams 141 and 142 arranged with their channels facing inwardly toward one another and having their flat exterior faces tilted inwardly and upwardly. The ends of the longitudinal beams are connected together by a pair of transversely extending downwardly bowed front and rear channel irons 144 and 145 arranged with their channels facing forwardly and rearwardly, respectively, and welded to the ends of the longitudinal beams.

Front channel iron 144 is arranged just in front of front axle 138 and is connected to the front axle by a horizontal longitudinal pivot assembly 146 of the type shown in Fig. 12. Pivot assembly 146 includes a pin (not shown) which passes through the channel iron 144 and is detachably bolted at its rear to a block 148 welded to the top surface of the front axle 138 at the middle of the axle. The pin carries on its forward end a sleeve 149 through which passes a vertical bolt 150 holding a clevis 151 of a drawbar 163 in position.

At the rear of the frame the cradle D is rigidly secured to the rear axle 139 by a pair of outrigger brackets 152 and 153 which are welded to the cradle across the joints where the ends of the longitudinal beams 141 and 142, respectively, join the ends of the rear channel iron 145; and the outrigger brackets in turn are detachably bolted to the rear axle at transversely spaced positions near the rear wheels by a pair of U-bolts 155 and 156.

Front and rear axles 138 and 139 are held in fixed parallel planes by a pair of longitudinal tie-rods 158 and 159, connected together at their rear ends by a connector 160 which is pivotally secured to the rear axle on a longitudinal pivot 161. Tie-rods 158 and 159 diverge from one another forwardly and are rigidly bolted to the front axle 138 near the ends thereof at transversely spaced positions.

A cylindrical casing C'' rests in the cradle D with its external walls conforming to the curvature of the bowed channel irons 144 and 145; and a tank T'' is arranged within the casing in spaced relation thereto and is supported above the frame F'' by a plurality of compression members and braces arranged near the opposite ends of the tank and welded to the tank at their upper ends. The rear support for the tank comprises a pair of vertical posts 166 and 167 having upper ends welded to the opposite sides of the tank at transversely spaced points. At their lower ends the rear posts pass through apertures in the casing C'' and the longitudinal channel beams 141 and 142, and are welded to both the casing and the beams, as shown in detail in Fig. 17.

In addition to the posts, the rear support includes a pair of transversely extending braces 171 and 172 welded at their inner ends to each other and to the bottom wall of tank T'' directly under its longitudinal axis. These braces slope gradually downward in opposite directions from the tank and are welded to posts 166 and 167, respectively, just above the internal wall of casing C''.

The front support for the tank T'' includes vertical posts 175 and 176 and transverse braces 177 and 178 constructed and arranged identically with corresponding members of the rear support described above. Additionally, the front support includes a pair of inclined braces 179 and 180 for resisting longitudinal forces. Braces 179 and 180 are welded at their upper ends to the opposite side walls of the tank adjacent to the upper ends of the respective posts 175 and 176, and slope downwardly and rearwardly to welded junctions with casing C'' and longitudinal beams 141 and 142. The lower ends of inclined braces 179 and 180 pass through apertures in and are welded to the casing C'' and the longitudinal beams 141 and 142, respectively, in a manner similar to that shown in Fig. 17.

The construction described hereinabove in connection with Figs. 13 to 17, inclusive, is exceptionally resistant to both longitudinal and transverse forces. Furthermore, the three-point suspension of the cradle D, with a longitudinal pivot at the front prevents distortion of the casing and tank when the vehicle is passing over a rough surface. Also, since the casing C'' and the tank T'' are rigidly connected together, insulating material will remain well distributed in the intervening space 188. Another advantage is that heat-leak from the outside of the casing C'' to the tank T'' is reduced to a minimum by the use of relatively small diameter posts and braces constructed of a material having poor heat conductivity but great strength, such as stainless steel. Furthermore, cradle D, casing C'' and tank T'' are built as a unit which can be removed at will from the frame F''.

Three modifications of tank vehicles have been described hereinabove to illustrate the principles of the invention. It is to be understood that changes in the specific construction and relative arrangement of parts can be made by persons skilled in the art within the scope of the claims appended hereto.

What is claimed is:

1. A tank vehicle comprising a frame including first and second transverse members, and longitudinal connecting means secured to said first member and pivotally connected to said second member on a longitudinal pivot; a casing arranged longitudinally above said frame; a tank within said casing in spaced relation thereto; first supporting means for one end of said tank and said casing connected to said longitudinal connecting means adjacent to but independent of said second transverse member; and second supporting means for the other end of said tank and said casing connected to said frame at a locality spaced longitudinally from said second transverse member toward said first transverse member; each of said first and second supporting means including compression members secured to both said tank and said casing for maintaining said spaced relation.

2. A tank vehicle according to claim 1 wherein said longitudinal connecting means comprises a pair of frame members joined together providing an apex adjacent to said pivot, said frame members diverging from one another and being secured to said first member at transversely spaced points.

3. A tank vehicle comprising, a frame including first and second transverse members, and longitudinal connecting means secured to said first member and pivotally connected to said second member on a longitudinal pivot; a tank arranged longitudinally above said frame; a first support for one end of said tank comprising a pair of struts having upper ends secured to said tank at transversely spaced positions, said struts converging together downwardly and having lower ends arranged adjacent one another, said lower ends being connected to said longitudinal connecting means adjacent said second transverse member; and a pair of second supports for the other end of said tank comprising a pair of uprights including posts having upper ends secured to said tank at transversely spaced positions, said uprights having lower ends secured to said frame at positions spaced transversely from one another and longitudinally from said second member, said second supports also comprising a pair of braces severally joined to said posts and secured to said tank at positions spaced longitudinally from said upper ends of said posts.

4. A tank vehicle according to claim 3, also comprising a casing enclosing said tank and supported by said first and second supports.

5. A tank vehicle according to claim 3 wherein said braces are arranged between said pair of posts and said pair of struts and are inclined upwardly from their junction points with the respective posts.

6. A tank vehicle according to claim 3 also comprising a casing enclosing said tank having apertures through which pass said first and second supports, said casing including hollow legs severally enclosing the portions of said supports below said casing, said hollow legs having lower ends joined to the respective supports and upper ends joined to said casing around said apertures.

7. In combination, a storage tank; a first support for one end of said tank comprising a pair of struts having upper ends secured to said tank at transversely spaced positions, said struts converging together downwardly and having lower ends connected together; and a pair of second supports for the other end of said tank comprising a pair of posts having upper and lower ends, said upper ends being secured to said tank at transversely spaced positions, and a pair of braces severally joined to said posts adjacent to said lower ends and secured to said tank at positions spaced longitudinally from said upper ends.

8. The combination defined in claim 7, also comprising a casing enclosing said tank having apertures through which pass said first and second supports, said casing including hollow legs severally enclosing the portions of said supports below said casing, said hollow legs having lower ends joined to the respective supports and upper ends joined to said casing around said apertures.

9. A tank vehicle comprising a frame including first and second transverse members, and longitudinal connecting means secured to said first member and pivotally connected to said second member on a longitudinal pivot; a tank arranged longitudinally above said frame; a first support for one end of said tank comprising a pair of struts having upper ends secured to said tank at transversely spaced positions, said struts converging together downwardly and having lower ends arranged adjacent one another, said lower ends being connected to said frame adjacent said second member; and a pair of second supports for the other end of said tank comprising a pair of uprights including posts having upper ends secured to said tank at transversely spaced positions, said uprights having lower ends secured to said frame at positions spaced transversely from one another and longitudinally from said second member, said second supports also comprising a pair of substantially horizontal longitudinal braces having ends severally joined to said posts, said longitudinal braces having opposite ends joined to the bottom of said tank, and a pair of transverse braces having ends severally joined to said posts, said transverse braces having opposite ends joined to the bottom of said tank.

10. A tank vehicle comprising a frame including first and second transverse members, and longitudinal connecting means secured to said first member, and pivotally connected to said second member on a longitudinal pivot; a casing arranged longitudinally above said frame; a tank within said casing in spaced relation thereto; a first support for said casing and said tank comprising a mount interposed between said longitudinal connecting means and said casing adjacent said second transverse member, and a pair of struts having upper ends secured to said tank at transversely spaced positions, said struts converging together downwardly and having lower ends arranged adjacent one another and connected to said casing directly above said mount;

and a pair of second supports for said casing and said tank comprising a pair of uprights having upper ends secured to said tank at transversely spaced positions and lower ends secured to said frame at positions spaced transversely from one another and longitudinally from said second transverse member, each upright comprising a pedestal welded to said casing internally thereof, a block welded to said casing externally thereof directly below said pedestal, a lower leg between said block and said frame, and a post supported at one end thereof by said pedestal and secured at the other end thereof to said tank.

11. In combination, a transverse frame member; a casing arranged longitudinally above said frame member; a tank within said casing in spaced relation thereto; a second frame member pivotally connected to said transverse frame member on a longitudinal pivot; a mount interposed between said second frame member and said casing; and a pair of struts having upper ends secured to said tank at transversely spaced positions, said struts converging together downwardly at an angle such that the axes thereof intersect substantially on the axis of said pivot, said struts having lower ends arranged adjacent one another and connected to said casing directly above said mount.

12. In combination, a frame; a tank arranged longitudinally above said frame; a pair of uprights including a pair of posts having upper ends secured to said tank at transversely spaced positions, said uprights having lower ends secured to said frame at transversely spaced positions; and a pair of transverse brace rods having ends severally joined to said uprights between the ends thereof, and opposite ends secured to the bottom of said tank.

13. In combination, a frame; a casing arranged longitudinally above said frame; a tank within said casing in spaced relation thereto; and a pair of uprights having upper ends secured to said tank at transversely spaced positions and lower ends secured to said frame at transversely spaced positions, each upright comprising a pedestal welded to said casing internally thereof, a block welded to said casing externally thereof directly below said pedestal, a lower leg between said block and said frame, and a post supported at one end thereof by said pedestal and secured at the other end thereof to said tank.

14. In combination, a tank; a first support for said tank comprising a pair of struts having upper ends secured to said tank at transversely spaced positions, said struts converging together downwardly and having lower ends arranged adjacent one another and connected together; and a pair of second supports for the other end of said tank comprising a pair of posts having upper ends secured to said tank at transversely spaced positions, a pair of substantially horizontal brace rods extending longitudinally of said tank having ends severally joined to said posts adjacent the lower ends thereof and opposite ends joined to the bottom of said tank, and a pair of transverse brace rods having ends severally joined to said posts adjacent the lower ends thereof and opposite ends joined to the bottom of said tank.

15. In combination, a casing; a tank within said casing in spaced relation thereto; a mount projecting down from the bottom of said casing; a pair of struts near one end of said tank having upper ends secured to said tank at transversely spaced positions, said struts converging together downwardly and having lower ends arranged adjacent one another and connected to said casing directly above said mount; and a pair of supports near the other end of said tank comprising a pair of posts having upper ends secured to said tank at transversely spaced positions and lower portions secured to said casing at transversely spaced positions internally thereof, blocks secured to said casing externally thereof below said last-named positions, a pair of substantially horizontal longitudinal braces having ends severally joined to said posts at points spaced from the wall of said casing and opposite ends joined to the bottom of said tank, and a pair of transverse braces having ends severally joined to said posts at points spaced from the wall of said casing and opposite ends joined to the bottom of said tank.

16. A tank vehicle comprising, a frame including first and second transverse members, and longitudinal connecting means secured to said first member and pivotally connected to said second member on a longitudinal pivot; a tank arranged longitudinally above said frame; and first and second supports for the opposite ends of said tank, said supports each comprising a pair of posts having upper ends secured to said tank at transversely spaced positions and lower ends secured to said frame at transversely spaced positions, said supports each also comprising a pair of transverse braces having ends severally joined to said posts adjacent the lower ends thereof and opposite ends joined to the bottom of said tank, said first support also comprising a pair of inclined braces connected at the upper ends thereof to said tank at transversely spaced positions adjacent said upper ends of the respective posts and at the lower ends thereof to said frame at positions spaced longitudinally from said lower ends of the respective posts and transversely from each other.

17. A tank vehicle comprising, a frame including first and second transverse members, and a cradle having a pair of transversely spaced longitudinal members and a pair of bowed cross members connecting together said longitudinal members adjacents opposite ends thereof, one of said cross members being secured to said first transverse member, the other of said cross members being pivotally connected to said second member on a longitudinal pivot; a casing resting in said cradle; a tank within said casing in spaced relation thereto; and first and second longitudinally spaced supports for said tank, said supports each comprising a pair of posts having upper ends secured to said tank at transversely spaced positions and lower ends extending through said casing and secured both to said casing and to said longitudinal members, said supports each also comprising a pair of transverse braces having ends severally joined to said posts within said casing and opposite ends joined to the bottom of said tank, said first support also comprising a pair of inclined braces connected at the upper ends thereof to said tank at transversely spaced positions adjacent the upper ends of corresponding posts and at the lower ends thereof extending through said casing and being secured both to said casing and to the same longitudinal members as are said corresponding posts.

18. In combination a cradle having a pair of transversely spaced longitudinal members and a pair of bowed cross members connecting together said longitudinal members adjacent opposite ends thereof; a casing resting in said cradle; a tank within said casing in spaced relation thereto; and first and second longitudinally spaced supports for said tank, said supports each comprising a pair of posts having upper ends secured to said tank at transversely spaced positions and lower ends extending through said casing and secured both to said casing and to said longitudinal members, said supports each also comprising a pair of transverse braces having ends severally joined to said posts within said casing and opposite ends joined to the bottom of said tank, said first support also comprising a pair of inclined braces connected at the upper ends thereof to said tank at transversely spaced positions adjacent the upper ends of corresponding posts and at the lower ends thereof extending through said casing and being secured both to said casing and to the same longitudinal members as are said corresponding posts.

19. A tank vehicle in accordance with claim 10, wherein said pair of second supports also comprises a pair of transverse brace rods having ends severally joined to said posts, and opposite ends secured to the bottom of said tank.

20. In combination, a frame; a casing arranged longitudinally above said frame; a tank within said casing in spaced relation thereto; a pair of uprights including a pair of posts having upper ends secured to said tank at transversely spaced positions, said uprights having lower ends secured to said frame at transversely spaced positions; and a pair of substantially horizontal longitudinal braces having ends severally joined to said posts, said longitudinal braces converging together and being joined at the opposite ends thereof together and to the bottom of said tank.

21. The combination in accordance with claim 20, also comprising a pair of transverse brace rods having ends severally joined to said posts, and opposite ends joined together and to the bottom of said tank.

22. A tank vehicle comprising a frame including first and second transverse members, and longitudinal connecting means secured to said first member and pivotally connected to said second member on a longitudinal pivot, said longitudinal connecting means comprising a pair of frame members connected together adjacent said pivot, said frame members being secured to said first member at transversely spaced points; a pair of longitudinal rods having ends joined together adjacent said first member and pivotally connected to said first member on a longitudinal pivot, said rods diverging from one another and being secured to said second member at transversely spaced points; a casing arranged longitudinally above said frame; a tank within said casing in spaced relation thereto; and means supporting both said casing and said tank on said frame independently of said second transverse member.

JOHN J. BREHANY.
PHILLIP M. AHLSTRAND.

REFERENCES CITED

The following references are of record in the file of this patent:

UNITED STATES PATENTS

| Number | Name | Date |
|---|---|---|
| 1,126,798 | Lind | Feb. 2, 1915 |
| 1,390,045 | Kramer | Sept. 6, 1921 |
| 1,908,684 | Buchanan | May 16, 1933 |
| 2,042,427 | Kinzel | May 26, 1936 |
| 2,086,134 | Ludwick | July 6, 1937 |
| 2,160,477 | Kramer | May 30, 1939 |
| 2,259,319 | Norbom | Oct. 14, 1941 |
| 2,412,146 | Hansen | Dec. 3, 1946 |